US011872817B2

(12) United States Patent
Zollner

(10) Patent No.: US 11,872,817 B2
(45) Date of Patent: Jan. 16, 2024

(54) INK PRINTER AND METHOD FOR PRINTING TO A RECORDING MEDIUM IN THE FORM OF A WEB

(71) Applicant: Canon Production Printing Holding B.V., Venlo (NL)

(72) Inventor: Werner Zollner, Eitting (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 17/727,289

(22) Filed: Apr. 22, 2022

(65) Prior Publication Data

US 2022/0339939 A1 Oct. 27, 2022

(30) Foreign Application Priority Data

Apr. 23, 2021 (DE) ..................... 10 2021 110 417.3

(51) Int. Cl.
*B41J 2/165* (2006.01)

(52) U.S. Cl.
CPC ....... *B41J 2/16544* (2013.01); *B41J 2/16526* (2013.01); *B41J 2/16585* (2013.01); *B41J 2002/16591* (2013.01)

(58) Field of Classification Search
None
See application file for complete search history.

(56) References Cited

U.S. PATENT DOCUMENTS 6,068,374 A * 5/2000 Kurata .................. B41J 15/005 347/108
8,668,305 B2 3/2014 Achatz et al.
2007/0146415 A1 * 6/2007 Jung .................... B41J 2/16511 347/33
2009/0141076 A1 * 6/2009 Muhl .................. B41J 2/16585 347/33
2020/0376845 A1 12/2020 Furukawa et al.

FOREIGN PATENT DOCUMENTS

DE 102010037829 A1 3/2012
DE 102013106211 B4 5/2015
JP 2008201061 A 9/2008

OTHER PUBLICATIONS

Search report issued in DE102021110417.3 dated Jan. 20, 2022.

* cited by examiner

*Primary Examiner* — Alejandro Valencia
(74) *Attorney, Agent, or Firm* — The Webb Law Firm

(57) ABSTRACT

For printing to a recording medium in the form of a web that is moved in a horizontal direction to the printing position by a web carriage. There, the recording medium is raised up to the print heads. To clean the print heads, a maintenance carriage is used that is moved horizontally into a maintenance position below the print bars. There, a cleaning unit with covering caps is then driven upward to the print heads in order to either place a covering cap onto the print heads or clean the print heads. The web carriage and the maintenance unit are moved only in a horizontal direction while the printing unit remains stationary.

6 Claims, 4 Drawing Sheets

INK PRINTER AND METHOD FOR PRINTING TO A RECORDING MEDIUM IN THE FORM OF A WEB

CROSS-REFERENCE TO RELATED APPLICATION

This application claims priority to German Patent Application No. 10 2021 110 417.3 filed Apr. 23, 2021, the disclosure of which is hereby incorporated by reference in its entirety.

BACKGROUND OF THE INVENTION

Field of the Invention

The invention relates to a high-capacity ink printer for printing to a recording medium in the form of a web. The invention also relates to a method for printing with ink to a recording medium in the form of a web.

Description of Related Art

Ink printers may be used for single-color or multicolor printing to a recording medium of diverse materials, for example paper, said recording medium being in the form of a web. The design of such ink printing apparatuses is sufficiently known. In particular, digital high-speed ink printers are known in which, to generate a print image, ink droplets are ejected from nozzles of a print head onto a rapidly moving recording medium in the form of a web.

In particular given multicolor inkjet printers, a plurality of print bars is normally provided for different inks, wherein a print bar is respectively provided with one or more print heads. Due to a high throughput of ink and a high transport velocity, the print bars (i.e. the nozzle plates of the print heads) may rapidly be soiled. The print heads therefore always need to be cleaned again so that the print quality is not negatively affected.

In order to clean the print heads of ink residues or other soil particles, a print head cleaning by means of what is known as flushing (purging) and wiping is implemented in defined cycles. The purging is a brief, strong ejection of ink through all print nozzles of a print head, whereby the print nozzles are flushed. Upon wiping, fluid residues are wiped off of the nozzle plate with a wiper blade. An absorbent cleaning belt, such as a non-woven material, that mechanically and/or wet-cleans the nozzle plates may also be used instead of a wiper. Additionally or alternatively, a wet cleaning may also be performed conventionally. A cleaning fluid is thereby sprayed onto the nozzle plate before the wiping, in order to dissolve adhesions and soilings on said nozzle plate. The nozzle plate is subsequently wiped off.

DE 10 2010 037 829 A1 describes an ink printer in which the printing unit may be moved out of a printing operation position, above the transport path of the recording medium, into a maintenance position that is situated to the side of the transport path of the recording medium. In this maintenance position, the print heads are accessible from below and their nozzle plates may be cleaned. A plurality of electrical and optical lines for power supply and to transmit the control signals for the print heads, as well as a plurality of mechanical lines and hoses to supply ink, are connected to the print head of a high-capacity printer. Due to the necessary movement of the, in part, very large printing unit, these supply feeds are executed so as to be highly flexible, and large-volume and long drag chains are necessary to guide these lines. Given this known apparatus concept, the technical cost is therefore relatively high, and the space requirement is increased due to the lateral movement of the printing unit.

In order to avoid this, from DE 10 2013 106 211 B4 an ink printer is known for printing with ink to a recording medium in the form of a web, given which ink printer a printing unit remains largely fixed in its position. The recording medium, which is arranged in a longitudinally movable transfer printing loop and runs across various rollers, is moved horizontally out of the printing position, into a parked position, to clean the print heads. A cleaning unit that was previously arranged below the transfer printing loop is then raised vertically into the released space.

In the embodiment there of an ink printer, two relatively large modules (cleaning unit and transfer loop) are respectively moved orthogonally to one another and travel relatively far. This embodiment thus necessitates a large space requirement, in particular with a high height, so that sufficient space is present in order to execute the movements without collision.

SUMMARY OF THE INVENTION

It is the object of the invention to achieve an ink printer and a method for printing to a recording medium in the form of a web, in which only a small installation space is required, given improved technical reliability.

This object is achieved for an ink printer via the features as described herein, and for a method via the features as described herein.

The ink printer thus has a printing unit that is arranged stationary in the ink printer. A movable web guide unit is arranged in a plane below the printing unit, so as to be linearly movable on a guide element. A movable maintenance unit for servicing the printing unit is likewise arranged so as to be linearly movable on the guide element, below the printing unit. Web guide unit and maintenance unit thus move axially in the same plane with the same linear guide.

In the printing operation, for guiding and printing to the recording medium the web guide unit is positioned in the region of the print bars, below the printing unit. In the maintenance operation to service the print bars, the maintenance unit is positioned below the printing unit. The web guide unit and the maintenance unit are mechanically coupled with one another in a detachable manner so that the web guide unit and the maintenance unit may be moved linearly, independently of one another or in common, in a horizontal direction on the guide element. While the web guide unit is arranged directly below the printing unit in the printing operation, the maintenance unit is arranged directly below the printing unit in the maintenance operation. Depending on the desired operating state, the corresponding units are moved linearly and horizontally into the corresponding position.

In the method for operating an ink printing for printing with ink to a recording medium in the form of a web, for printing to the recording medium, a web guide unit is initially moved below the printing unit, into a printing position, via a linear movement. A web guide element is then to be moved vertically with the recording medium in an upward stroke movement, toward the printing unit, until a desired printing gap is set. The recording medium may now be printed to.

In both the linear movement and the stroke movement, the recording medium is corrected in terms of its length and its tensile stress so that a desired start position on the recording medium upon restarting the printing and a desired tensile stress are maintained. After the printing, the web guide unit is driven out of the printing position in a linear movement.

A maintenance unit to service the printing unit is moved below the printing unit, into a maintenance position, in a linear movement. Cleaning and/or protective elements are then moved in the direction of the printing unit, in an upward stroke movement, in order to clean and/or protect the printing unit.

This device and this method have the advantage that only the web guidance unit and the maintenance unit need to be moved over greater distances, and only linearly in the same direction. They are moved on a common guide rail. The large printing unit, provided with numerous supply lines, is arranged stationary and therefore does not need to be moved. In addition to this, lighter elements, such as cleaning and/or protective elements as well as web guide elements, may perform a brief stroke movement independently of one another via a separate drive, without the web guide unit or the maintenance unit needing to be moved as well. A smaller installation height of the ink printer is thus achieved. Since the ink printer is in any event designed to be relatively long, for the drying of the ink, this length may be utilized well for the horizontal displacement of web guide unit and maintenance unit. Advantageously, only light units are moved in a stroke movement, whereas the two heavier units (web guide unit and maintenance unit) are moved only linearly in a horizontal direction.

It is thus advantageous if the web guide unit has one or more web guide elements to guide the web of the recording medium, wherein the web guide element is coupled with a lifting device, in the printing operation, in order to move the recording medium in the direction of the printing unit, into a transfer printing position, for the printing operation. The drive for the stroke movement may thus be of minimally small dimensions, and is independent of the main drive for the linear movement of the printing unit and the maintenance unit.

It is additionally advantageous if the maintenance unit has a cleaning device and a covering device that may respectively execute short, vertical stroke movements in the direction of the print bars in order to clean the print heads and to protect them with an attachable covering device. The web guide unit and the maintenance unit are thereby not moved as well in a vertical direction.

In addition, it is advantageous that the ink printer requires only a lifting device of relatively small dimensions, with which only the respective stroke movement for the web guide element or the cleaning device and/or the cover device may be implemented, independently of the linear movement.

If the cleaning device has a wiping apparatus and possibly a spraying apparatus, the print heads may thus be wet-cleaned and subsequently wiped dry.

It is also advantageous if the covering device is connected with the cleaning device so as to be detachable, wherein the two jointly perform the stroke movement and are only separated from one another if the cover device, in the parked state, covers the print heads to protect the nozzles against being dried out and may remain there. There is thus no need for a separate drive for the cover device.

If the print bars are designed so as to be passively movable, they may thus be moved as well in the same direction upon the stroke movement of the cover device and/or of the cleaning device, so that the print heads do not protrude into the travel path of web guide unit or maintenance unit and, in the parked state, are safely parked in the printing unit together with the cover device. They therefore do not need a separate drive for the stroke movement.

It is particularly advantageous if the web guide unit has a length compensation device via which, given the linear movement of the web guide unit, a desired start position on the recording medium is maintained upon restarting the printing and a desired tensile stress in the recording medium are maintained. The printing may thus be continued without interruption (i.e., without spoilage) at the correct, desired position (print line) after the cleaning process.

BRIEF DESCRIPTION OF THE DRAWINGS

Exemplary embodiments of the invention are explained in detail in the following using schematic drawings. Shown are.

DETAILED DESCRIPTION

Figure 1:
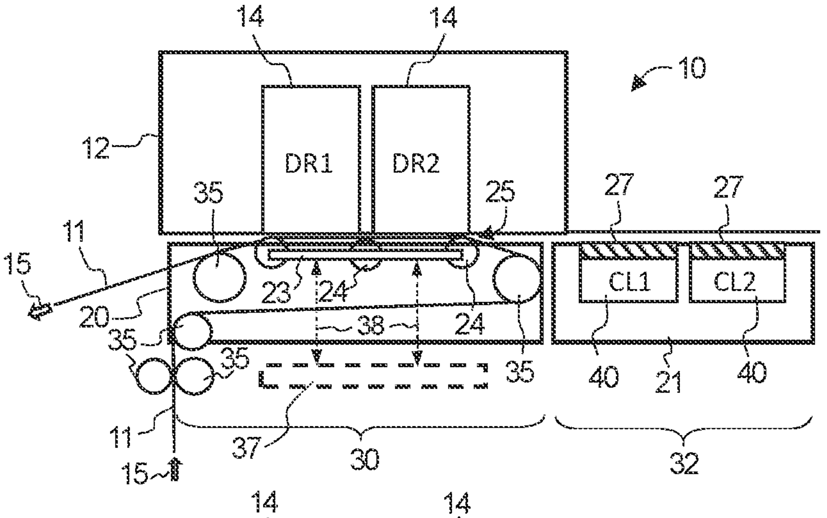
FIG. 1 is a view of an ink printer according to the invention, in printing operation.

In the following, the invention is explained in detail using an ink printer, which here is designed for two-color printing. For this purpose, the ink printer has per color a respective print bar having one or more print heads that may print over a line width to a recording medium in the form of a web. Of course, ink printers having more or fewer print bars for more or fewer colors or inks may also be used, without deviating from the ideas of the invention. Only the components that are significant and essential for the functionality of the invention are explained in detail in Figures, and functionally the same or identical elements are labeled with the same reference characters.

A first exemplary embodiment of an ink printer 10 for printing to a recording medium 11 in the form of a web is depicted in FIG. 1, wherein the recording medium 11 is transported through the ink printer 10 in the transport direction 15 (see thick arrows). A printing unit 12 has two print bars (DR1 and DR2) with which the recording medium 11 may be printed to line by line. The print bars 14 extend, transverse to the transport direction 15, across the entire width (transverse to the transport direction 15, meaning the line width) of the recording medium 11 in order to print to this line by line (the line extension travels into the plane of the drawing in FIG. 1).

The printing unit 12 is arranged in the ink printer 10 so as to always be stationary, and is moved neither horizontally nor vertically. Only the print bars 14 may exhibit a slight stroke travel 16 (see FIG. 2) in a vertical direction, which, however, is not traveled actively but rather is forced by another element (thus is passive), as is explained in more detail further below.

Arranged below the printing unit 12, on a common axis in a horizontal plane, are a web guide unit (referred to in the following as a web carriage 20) and a maintenance unit 21. The web guide unit and the maintenance unit 21 may be guided along the horizontal axis by a guide element (referred to in the following as a guide rail 22; as shown in outline in FIGS. 2 and 3) and be moved axially (corresponding to a linear movement in a horizontal direction).

In the exemplary embodiment according to FIG. 1, the web carriage 20 is located—with respect to the horizontal position—directly below the print bars 14. With regard to the web carriage 20, this position is therefore referred to in the following as a horizontal printing position 30. The web carriage 20 has a web guide element that may have a web guide carrier 23 and one or more web guide rollers 24. Via the web guide element 23, 24, the web of the recording medium 11 is directed past the print bars 14 in the transport direction 15 and with largely constant clearance (this is referred to as a printing gap 25) from the nozzle plates. For printing, the recording medium 11 is thus guided approximately parallel to the nozzle plates of the print heads (this may be a straight or curved printing gap 25 in the region of the print bars 14). The recording medium 11 may thus be printed to line by line in the region of the printing gap 25.

In the exemplary embodiment according to FIG. 1, the maintenance unit 21 is located in its parked position 32. It is parked there until a cleaning of the print bars 14 is necessary or a protective covering (referred to in the following as a covering cap 27) should be placed on the print bars 14. For this purpose, it is then moved into a horizontal maintenance position 33 below the print bars 14, and in fact into the position in which the web carriage 20 was previously in its printing position. This is explained in further detail below with reference to FIGS. 2, 5, 6, 7, and 8.

The web carriage 20 and the maintenance unit 21 are moved axially back and forth in the same plane (horizontal plane). The web carriage 20 and the maintenance unit 21 are guided with the same linear guide (typically one or more guide rails 22). Web carriage 20 and maintenance unit 21 are advantageously coupled with one another so as to be detachable, so that they may be moved linearly along a horizontal axis in common or also independently of one another.

The web guide carrier 23 may be solidly coupled with a plurality of web guide rollers 24 so that, by moving the web guide carrier 23 (in a vertical direction), the web guide rollers 24 and thus the web of the recording medium 11 may be moved as well.

Additional transport and deflection elements (such as transport or deflection rollers 35) guide the recording medium 11 in the form of a loop upon transport in the transport direction 15 (see arrows in FIG. 1) via the web carriage 20.

In the first exemplary embodiment, a lifting device 37 is arranged below the web carriage 20. The lifting device 37 has a drive (not shown) that may be mechanically coupled with the web guide carrier 23 via two or more stroke guide rods 38 (symbolized in Figures by the long, dashed double arrows) in order to lift the recording medium 11 in a vertical direction in an upwards stroke with the aid of the web guide carrier 23 until a desired height of the printing gap 25 is achieved between recording medium 11 and nozzle plates of the print heads. In the upwards stroke, the recording medium 11 remains plane-parallel with respect to the nozzle plates of the print heads.

At least one web guide carrier 23 is respectively arranged laterally next to the web of the recording medium 11 (two web guide carriers 23, next to the web to the left and right, are typically sufficient). The stroke guide rods 38 are likewise arranged laterally next to the web and enclose the recording medium 11 without contacting it (the stroke guide rods 38 are typically present in pairs, or as a plurality of pairs, due to the stability and a uniform stroke movement). By means of the stroke guide rods 38 that engage at the web guide carrier 23, the recording medium 11 may therewith be moved up and down in a vertical stroke movement.

The printing may subsequently be begun, in which the recording medium 11 is transported and thereby is printed to line by line. If the printing process is interrupted for a longer time, the recording medium 11 is moved downward again in a downward stroke via the lifting device 37. The upward stroke and the downward stroke are small, brief stroke movements in a vertical direction. The web carriage 20 itself is not thereby moved, but rather only the web guide element 23, 24 (with the web guide carrier 23 and with the web guide rollers 24) that guides and transports the recording medium 11 in the region of the printing gap 25.

The stroke guide rods 38, which are mechanically coupled with the web guide element 23, 24, serve to move the web guide element 23, 24—and therewith the recording medium 11—in a vertical stroke movement. So that the transport of the recording medium 11 is not prevented given the stroke movement, the stroke guide rods 38 are thereby arranged outside (respectively to the side of the web) of the recording medium 11 (i.e., before and after in FIG. 1).

The maintenance unit 21 serves for cleaning and protecting the print bars 14 (i.e., the nozzle plates of the print heads located therein). It has, for each print bar 14, a respective cleaning device 40 (CL1 or CL2) having a respective covering cap 27. The cleaning device 40 and the covering cap 27 may also be moved in a vertical direction (orthogonal to the horizontal movement plane) in a small upward stroke or downward stroke (the maintenance unit 21 itself is not thereby moved). This stroke movement may be produced with the lifting device 37 as soon as the maintenance unit 21 is located in the maintenance position 33, if the web carriage 20 has previously left its printing position 30 and has been moved into its horizontal parked position 31. In the event of cleaning device 40 and covering cap 27, the stroke guide rods 38 engage at the respective elements (i.e., cleaning device 40 and/or covering cap 27) of the maintenance unit 21 in order to raise or lower this in a stroke movement.

Figure 2:
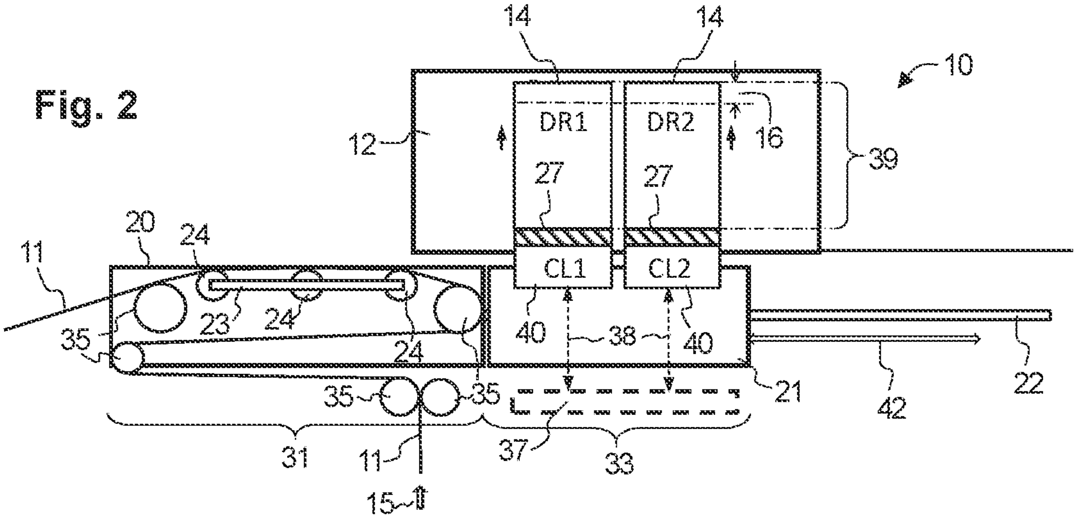
FIG. 2 is a view of the ink printing apparatus, in cleaning operation (purging)

In FIG. 2, the maintenance state is depicted in which the maintenance unit 21 has been moved below the print bars 14 along a linear travel path 42 (see double arrow). Since, in this operating state (parked position 31 of the web carriage 20), the recording medium 11 may be at a standstill and does not need to be transported further, the recording medium 11 is in a rest state (i.e., no printing operation, but rather a parked state). However, a transport of the recording medium 11 is theoretically always possible.

The web carriage 20 thus had previously left the printing position 30 and been moved into its parked position 31 so that the maintenance unit 21 may assume its maintenance position 33. The maintenance position 33 of the maintenance unit 21 is largely identical to the printing position 30 of the web carriage 20.

In the exemplary embodiment according to FIG. 2, the maintenance unit 21 is depicted in the maintenance position 33 into which the cleaning device 40 and the covering cap 27 have been moved with the aid of the lifting device 37 via an upward stroke in the direction of the print bars 14, so that the covering caps 27 press onto the print bars 14 from below, and the print bars 14 are thereby passively pushed higher into their position via a predetermined small stroke travel 16.

In this position, the covering cap 27 may engage in the printing unit 12 and be locked so that the print bar 14 rests on the covering cap 27 fixedly (but so as to be releasable again). The covering cap 27 is thus fixedly connected with the print bars 14 and may remain there in the parked state (this raised state of the covered print bars 14 is also referred to as parked position 39). A drying out of the nozzles of the print heads is thus prevented.

In the parked state 39, the covering cap 27 is thereby mechanically locked in the printing unit 12 so that its position may, of course, be kept without the influence of force by the lifting device 37.

A purging is also possible in the parked position 39. The covering caps 27 may thereby also be at least partially filled with a fluid so that a humid climate is created in the region of the nozzles and the nozzles do not dry out as rapidly. The filling, flushing, and emptying of the covering cap 27 preferably takes place from above via pipes/lines (not shown). These protrude into the covering cap 27 only due to the upward stroke movement of the covering cap 27.

The print bars 14 are thereby passively and forcibly raised as well, without being themselves driven, until the underside of the covering caps 27 no longer projects out of the underside of the printing unit 12. In this position, the covering caps 27 are locked in the printing unit 12 via a suitable locking mechanism. A separate, motorizing raising of the print bars 14 and a separate, motorized positioning of conventional covering caps are thus unnecessary. The installation height of the printing unit 12 may thus be reduced, since only a very small stroke path 16 must be traversed. As a result of this, the lifting device 37 may be of very small dimensions, which advantageously results in a lower weight. Short movement times are thereby particularly relevant and advantageous.

The covering caps 27 may also be placed only briefly (temporarily) onto the print bars 14 in order, for example, to flush/purge the nozzles with cleaning fluid or ink and increased pressure. The fluid that is flushed through is captured by the covering caps 27 and disposed of from there. The components of the ink printer 10 that are located outside of the covering caps 27 are thus protected against contamination upon flushing (purging). Cleaning fluids may be directed into the print bars 14 and covering caps 27 and also be pumped out therefrom via hoses or pipes.

Only a single drive is required for the horizontal, axial movement (also referred to as a linear movement) of the web carriage 20 and of the maintenance unit 21. The two units are not fixedly coupled with one another, but rather flexibly, for example via electromagnetic or electromechanical locks (not shown in Figures). The possibility thereby results of moving both units separately from one another or in common in the horizontal direction (linear movement).

Figure 3:
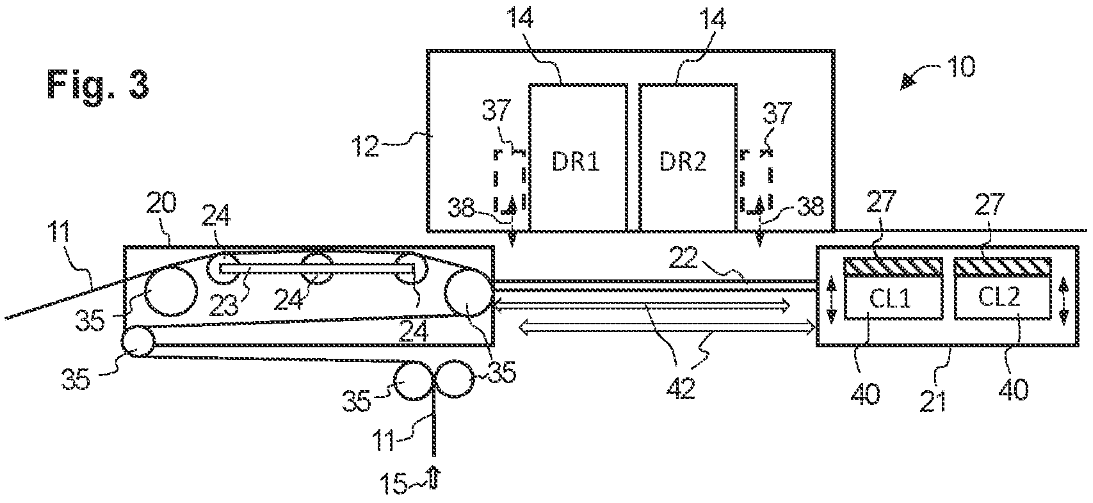
FIG. 3 is a view of the ink printing apparatus in a state in which print bars are accessible for a manual service.

The movement region of the two units is depicted in FIG. 3, where the two units are respectively depicted in their horizontal parked position 31, 32, which parked positions 31, 32 are respectively far to the outside at the edge of the printing unit 12. For the printing operation, the web carriage 20 is moved into the printing position 30 (i.e., the region below the print bars 14, as depicted in FIG. 1). For the maintenance operation, the maintenance unit 21 is moved from its parked position 32 into the maintenance position 33 (i.e., into the region below the print bars 14, as depicted in FIG. 2). The web carriage 20 and the maintenance unit 21 are moved linearly on a straight line via a linear guide rail 22 (linear movement, or also referred to as a translation movement).

Given the movement of the web carriage 20, the movement of the recording medium 11 is blocked at the input side (infeed motor). Upon movement of the web carriage 20, a minimum length compensation along the web of the recording medium 11, as well as a tensile stress control (for example via active dancing rollers/paper loops, or via a moment-controlled outfeed motor), must be achieved. Otherwise, the web might be exposed to excessive tensile stress, and in the worst case might rip. The current position (line) at which printing has directly occurred is not altered by this length compensation; rather, the web length change is compensated from the output of the ink printer 10 up to the printing position 30, so that the correct starting position on the recording medium 11 is again directly present below the print bars 14 after the movement and upon restarting the printing. A necessary, predetermined tensile stress in the recording medium 11 is maintained upon moving, so that the printing after the displacement may also actually be restarted (or continued) at precisely the desired starting position on the recording medium 11. The precision of the positioning of the starting position is thereby in the range of approximately 20 to 100 μm, depending on the print resolution.

Via this length compensation, the current starting position on the recording medium 11 is maintained upon restarting the printing (desired new print lines for restarting the printing are located at a corresponding position in the region of the web guide roller 24), as well as the tensile stress in the web. A nearly complete length compensation thus occurs between the printing position 30 and the parked position 31 upon movement of the web carriage 20.

This length compensation and tensile stress compensation are also active given the stroke movement, since the web must thereby also be compensated in terms of its length. For example, the transport steps are thereby measured precisely via increment rollers and are reset after the movement so that the precise starting position may be reestablished after the movement of the web carriage 20 or of the web guide element 23, 24.

The maintenance unit 21 is arranged outside of the region of the print bars 14 (thus in its parked position 32) during the printing operation. The maintenance unit 21 is moved under the print bars 14, into its maintenance position 33, only as needed (for the maintenance of the print bar 14), thus in the maintenance state.

Figure 4:
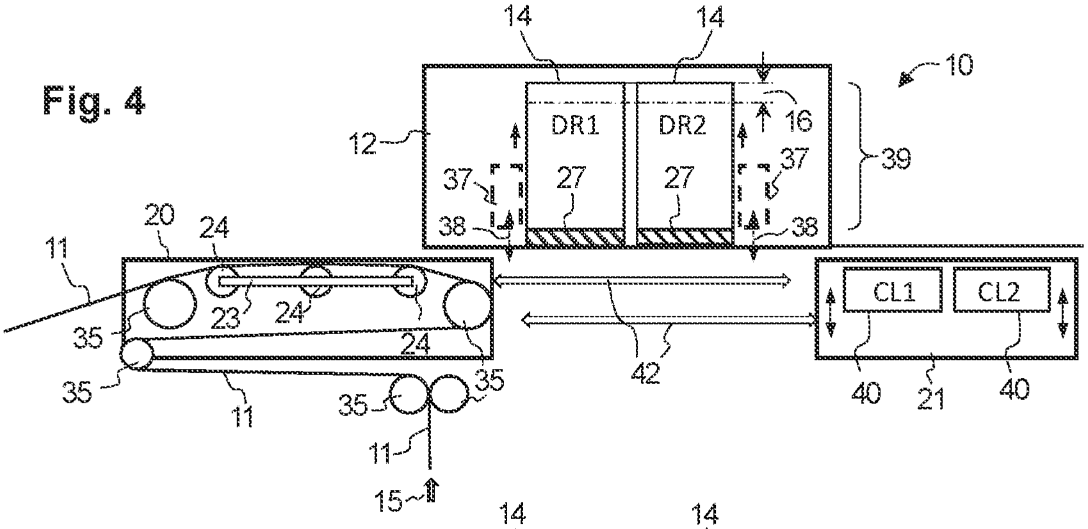
FIG. 4 is a view of the in particular in which the print bars are in a parked state.

If the printing operation has completely ended and the ink printer 10 is deactivated, the ink printer 10 is thus in a parked state. In this parked state—as depicted in FIG. 4—the two print bars 14 together with the put-on/placed covering caps 27 are in their raised, vertical parked position 39, meaning that they are driven out of the printing region (upward stroke) and are located higher by the stroke travel 16 so that the placed covering caps 27 do not protrude into the printing gap 25. In Figures, print bars 14 charged with an upward stroke are characterized by a small arrow next to the print bars 14. The print bars 14 may remain in the raised position even if the cleaning devices 40 are separated from the covering caps 27.

The web carriage 20 and the maintenance unit 21 are in their respective parked positions 31 or 32. In this state, the print bars 14 are freely accessible (this may be with or without covering cap 27). In this parked state, a new recording medium 11 may be placed or threaded, with simpler accessibility, into the ink printer 10. However, the sensitive print heads should thereby remain protected by the covering caps 27. In this state, the print bars 14 may also be easily inspected manually or optically by service technicians, or be exchanged, since in this state they are well and simply accessible from below.

In FIGS. 3 and 4, an embodiment is depicted in which the lifting device 27 is arranged laterally next to the print bars 14. The stroke guide rods 38 (not shown here) must then be moved up and down laterally (i.e., longitudinally next to the web) of the recording medium 11, from the lifting device 37 to the corresponding elements in the web carriage 20 or the maintenance unit 21, in order to be coupled there with these elements and raise or lower these in a small stroke movement. The stroke movement may thus occur without the recording medium 11 and the print bars 14 being thereby negatively affected or contacted.

Figure 5:
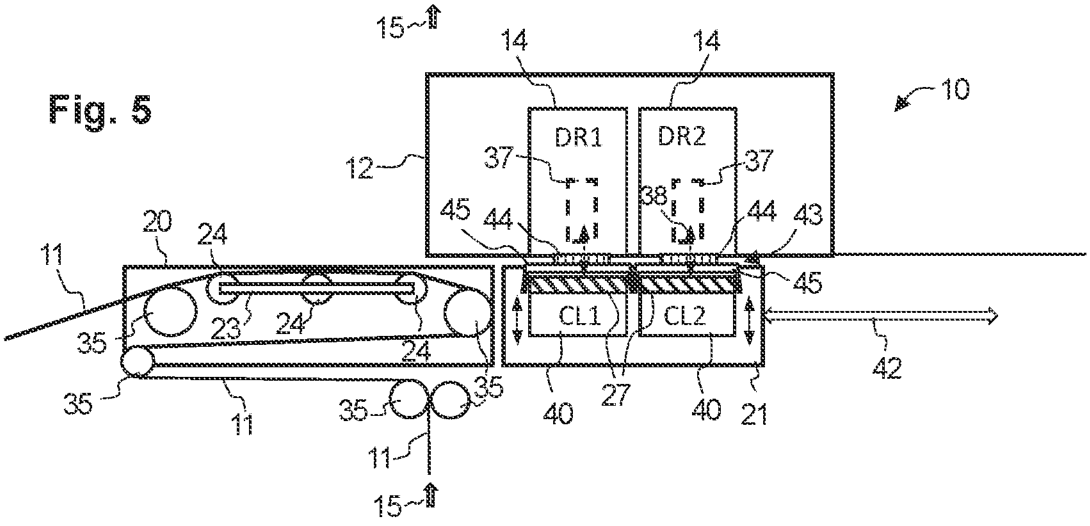
FIG. 5 is a view of the exemplary embodiment of the ink printing apparatus, in which the print bars are cleaned separately from one another (wiping)

In order to clean the print heads of ink residues or other contaminants, a print head cleaning as it is depicted in FIG. 5 is performed from time to time, or upon demand. The cleaning devices 40 are thereby raised by the lifting device 37 (here in the longitudinal direction before and after the print bars 14) far enough that the covering caps 27 still exhibit a clearance from the print bars 14.

The print heads are first purged beforehand (flushing of the nozzles at higher pressure), wherein the cleaning fluid is captured by the covering caps 27. For this purpose, the covering caps 27 are placed on the print bars 14 as depicted in FIG. 2. The nozzle plates must subsequently be cleaned of residual ink, cleaning fluid, and dust particles.

For this purpose, the covering caps 27 are moved downward somewhat in a downward stroke so that a somewhat greater clearance is created with respect to the nozzle plates. One or more wipers 43 having a respective elastic wiper blade 44 are subsequently driven into this space between nozzle plates and the covering caps 27, along the print bars 14. The wiper blades 44 are then positioned with the aid of the lifting device 37 and brought into contact with the nozzle plates, and are moved along the longitudinal axis of the print bars 14 and thereby wipe off the nozzle plates.

Before the wiping, the nozzle plates may also be additionally sprayed by spray nozzles with a cleaning fluid, the residues of which may also be wiped off via the subsequent wiping process.

The wiper 43 with its wiper blades 44 is located at the end of the cleaning device 40 in the rest state, but outside of the region of the print bars 14, so that the wiper 43 cannot hinder or interfere with the stroke movement. The process of covering of the print bars 14 by the covering caps 27 is thus also not negatively affected.

For spraying of the print bars 14, the cleaning devices 40 are driven upward so far that only the nozzle plates may be sprayed well with a cleaning fluid. The spray nozzles may thereby be moved like the wipers 43, with the same drive, from front to back or vice versa (i.e., in the line direction) in order to spray on the cleaning fluid.

For this purpose, the covering caps 27 are not placed on the print bars 14, of course. The print bars 14 are therefore also not raised up, but rather are located directly at the height of the printing gap 25.

In the cleaning of the nozzle plates, the cleaning devices 40, including the covering caps 27, are removed from the print bars 14 insofar as that the wiper 43 with its wiper carriers 45 may travel through in a horizontal movement along the print bars 14, along suitable longitudinal guides (in the line direction) in the intervening spaces, and wipe off the nozzle plates.

In this embodiment, the cleaning devices 40 with the covering caps 27 may be moved separately from one another in the upward stroke and the downward stroke. The covering caps 27 are, of course, detachable from the respective cleaning device 40 and may be placed on the print bars 14 and remain there while the cleaning device 40 is driven downward again and is brought into the starting position.

In the exemplary embodiment according to FIG. 5, each wiper 43 has a wiper carrier 45 independent of the others, so that the wipers 43 may be moved separately from one another. Each wiper carrier 45 thus respectively spans a cleaning device 40. Each wiper 43 may thus on its own wipe off, and thus clean, the nozzle plates of the respective print bar given a longitudinal movement along the print bars 14.

Figure 6:
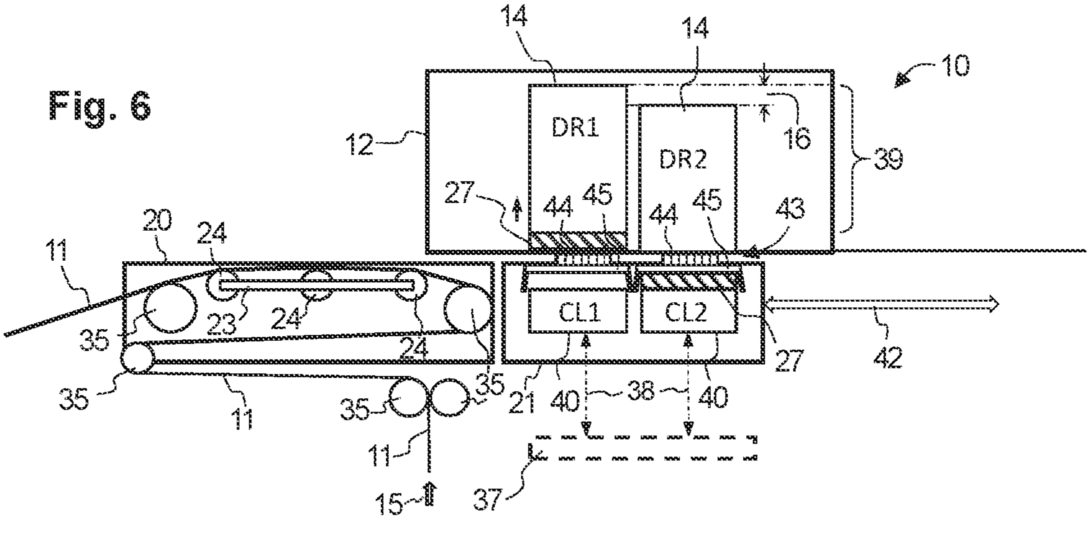
FIG. 6 is a view of the exemplary embodiment according to FIG. 5, in which one the print bars is in a parked state and the other is being cleaned (wiping)

If only one of the print bars 14 (here DR2) must be cleaned and the other (here DR1) was inactive, the first print bar 14 (DR1) is—as depicted in FIG. 6—covered with the covering cap 27 in the parked position 39 and is protected. This first print bar 14 (DR1) has been forcibly pushed upward (by the stroke travel 16 with respect to the second print bar 14 (DR2)), as a result of the stroke movement of the cleaning device 40 (CL1) with the covering cap 27, so that the print bar 14 is securely parked and the wiper 43 does not contact the covering cap 27 given a possible wiper movement. The second print bar 14 is not covered with the covering cap 27 and may be conventionally cleaned off. For this purpose, the second print bar 14 (DR2) is cleaned with the aid of the associated wiper 43 and the associated cleaning device 40 (CL2), in that these are driven back and/or forth, transverse to the longitudinal axis of the print bar 14 (in the line direction), and thereby, if applicable, spray and wipe off the nozzle plate.

Figure 7:
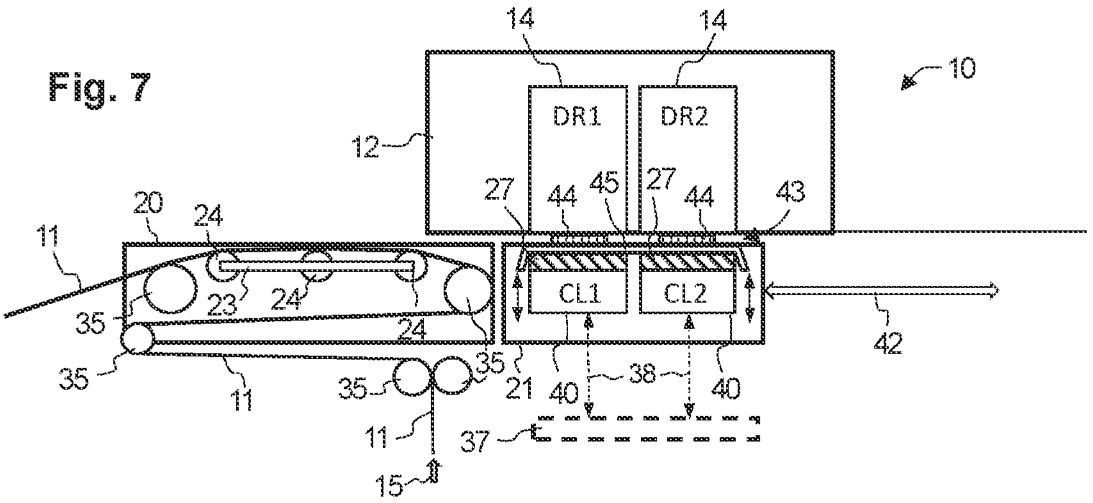
FIG. 7 is a view of a further exemplary embodiment of the ink printing apparatus, in which all print bars are cleaned with a common wiper.

In FIG. 7, an exemplary embodiment is depicted in which the two wiper blades 44 are arranged together on a common wiper carrier 45. The wiper carrier may likewise be moved in the line direction along the cleaning device 40, along guide rails. The wiper carrier 45 spans both cleaning devices 40 and is moved, during the wiping process, along the print bars 14 so that both wiper blades 44 are in contact with the nozzle plates and the wiper carrier 45 does not contact the cleaning devices 40, since they might otherwise be damaged. The print bars 14 may thus be cleaned jointly via wiping (and possibly prior spraying) in a movement process. A drive (or a plurality of drives, given more than two print bars 14)(and possibly one or more guide rails) is thus spared in comparison with individually movable wipers 43, and both print bars 14 are thus cleaned simultaneously in one process. Separate wipers 43 may also be moved simultaneously.

The cleaning of an individual print bar 14 by means of central, common wiper carrier 45 thus functions analogous to a respective wiper carrier 45 for each wiper 43. The cleaned off cleaning fluid is, in both instances, captured in the covering caps 27, since these extend directly below the print bars 14 and are designed open at the top, like a pan. From there, the captured fluid is, for example, pumped away and disposed of or reused (for example given parked print bars 14). Additional pans for the cleaned-off cleaning fluid are thus unnecessary. Less space is thus required as well for the implementation of the cleaning fluids, in comparison to conventional covering caps 27.

The height position of the wiper blades 44 in relation to the nozzle plates can be set arbitrarily by the lifting device 37 via the upward stroke movements of the cleaning devices 40. For example, the wiper 43 may thus be driven with more or less contact pressure, or gently, against the nozzle plates, and be gently driven away therefrom again at the end without spattering of the cleaning fluid located on the wiper 43.

Figure 8:
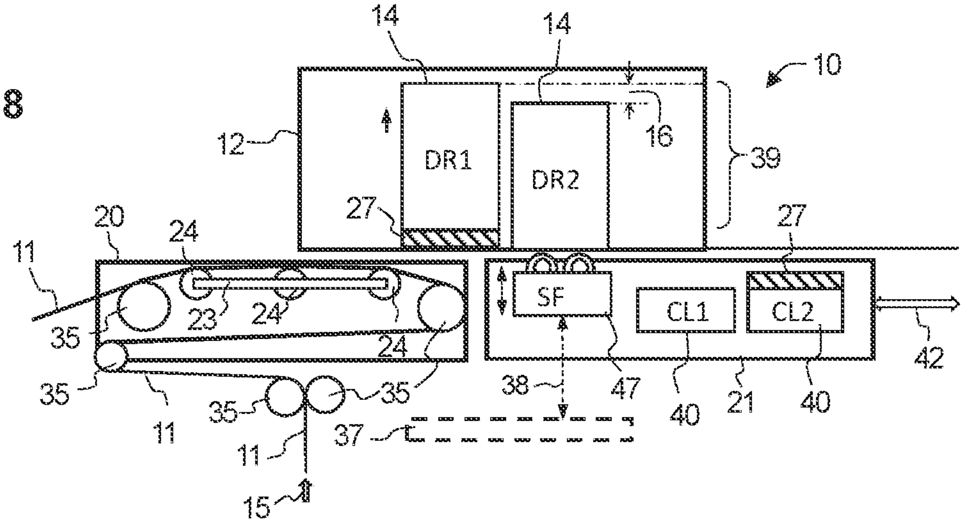
FIG. 8 is a view of an exemplary embodiment of the ink printing apparatus, in which an additional maintenance on one of the print bars is performed in the cleaning operation.

Since installation space is spared via the embodiments present here, additional functions may be implemented in the ink printer 10, as is shown by way of example in FIG. 8. There, the maintenance unit 21 is designed somewhat longer, so that an installation space therein is free in order to utilize this for one or more auxiliary devices or a special maintenance device 47 (SF). Expanded maintenance functions may be implemented as a maintenance device (47), for example the use of a camera system for nozzle inspection or a special print head cleaning by means of a surge cleaning of the nozzle plates with cleaning fluid or in the form of a cleaning with non-woven strips. Print head settings can also advantageously be reviewed via a camera system.

The first print bar 14 (DR1) is thereby in its parked position 39, whereas the second print bar 14 (DR2) is not raised and not covered, so that the corresponding print heads may be serviced, here by means of the special maintenance device 47.

In the exemplary embodiment according to FIG. 8, only the second print bar 14 (DR2) is serviced, whereas the first print bar 14 (DR1) is located in its parked position 39 and covered with the covering cap 27.

Figure 9:
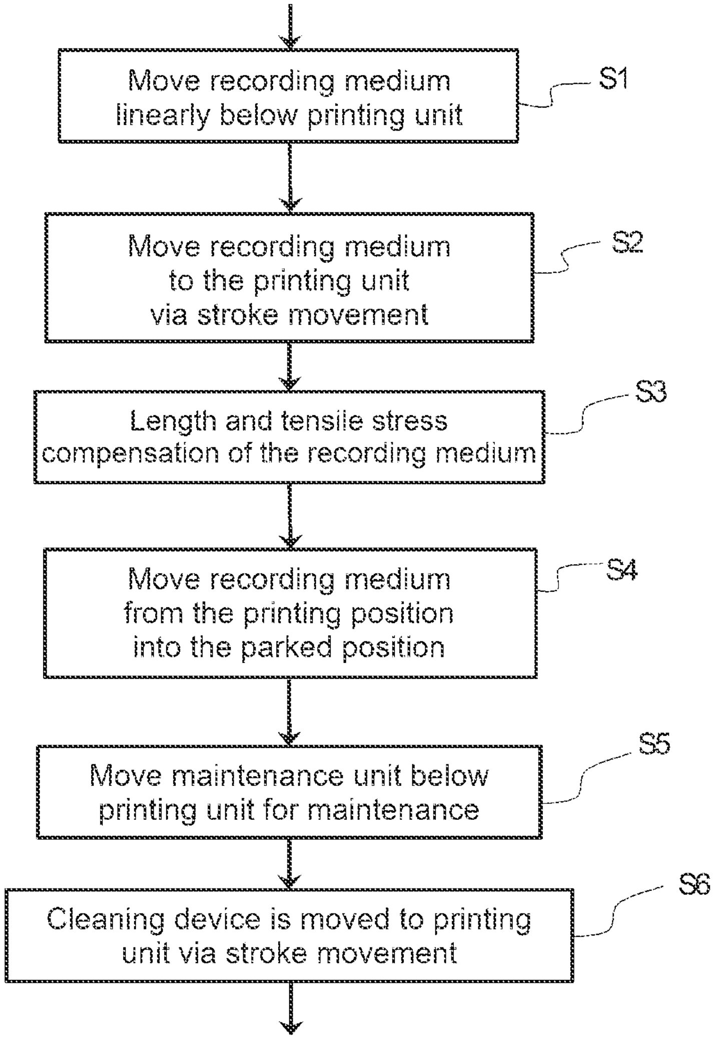
FIG. 9 is a workflow diagram for a method for printing to a recording medium in the form of a web.

A method for printing to a recording medium 11 with an ink printer 10 is depicted in FIG. 9. In step S1, a web carriage 20 for printing to the recording medium 11 is thereby moved into the printing position 30 via a linear movement below the printing unit 12. For printing to the recording medium 11, in step S2 this is now to be moved in a stroke movement toward the printing unit 12, with the aid of the web guide element 23, 24, until a desired printing gap 25 is set. In the stroke movement, a length and tensile stress compensation of the recording medium 11 occurs in step S3 so that a restart of the printing may occur at the correct and desired line position.

For maintenance of the printing unit 12, in step S4 the web carriage 20 is driven linearly out of the printing position 30, into its parked position 31. For this, in step S5 a maintenance unit 21 for maintenance of the print bars 14 is driven into the maintenance position 33 in the region of the later transfer printing. In a small stroke movement, in step S6 the cleaning device 40 is moved in the direction of the print bars 14 in order to be able to clean the nozzle plate of the print heads. If the print bars 14 are inactive for a longer time, they are covered and thus protected with a covering cap 27 in what is known as a parked state so that the nozzles do not dry out. The covering cap 27 is placed by the maintenance unit 21 onto the print bars 14 via a stroke movement in the direction of the print bars 14.

If the recording medium 11 should be printed to again, the maintenance unit 21 is driven out of the maintenance position 33 and, at the same time, the web carriage 20 is driven into the printing position 30 and the web carriage 20 is raised somewhat in the direction of the print bars 14. Given the horizontal linear movement of the web carriage 20, a length and tensile stress compensation of the recording medium 11 is also performed.

With such an ink printer 10 having a stationary printing unit 12, huge flexible lines are no longer required for supplying the print heads. In addition to this, all lines and hoses may turn out to be shorter, since the print bars 14 are no longer moved (apart from the small stroke movement). A drag chain is also not required, since no flexible cables, pneumatic lines, or hydraulic lines need to be guided over greater distances.

In comparison to systems with conventional ink print heads, the web carriage 20 and the maintenance unit 20 have a significantly smaller weight. The components can thereby move faster, for example in order to arrive from the printing operation into the cleaning operation. In addition to this, both are moved only on a horizontal axis, which makes the associated drive less complicated. This saves on a great deal of installation space, in particular in the height of the ink printer 10.

The times in order to place the covering caps 27 onto the print bars 14 can also be reduced, since only a very short stroke travel 16 is necessary for this. In addition, corresponding drives for the vertical movement of the print bars 14 are foregone due to passive raising of the print bars 14 by the maintenance unit 21. The short stroke travel 16 has the advantage that no separate drives are required, and only those with short lengths and guides are necessary. The recovered space leads to more design freedom for the printing unit 12 and the ink printer as a whole.

The separate movement of web carriage 20 and maintenance unit 21 facilitates manual service tasks at the printing unit 12, since both may be moved outward to the side so that the region of the print bars 14 with the nozzle plates may be made freely accessible. This also facilitates an implementation of modular components in the ink printer 10.

If the recording medium 11 executes a stroke movement in a vertical direction, this enables a rapid and simple adaptation and adjustment of the height of the printing gap 25 without needing to readjust the complete printing unit 12. The entire web carriage 20 also does not need to be moved in a vertical direction in order to adjust the printing gap 25.

An adaptation to the thickness of the recording medium 11 is likewise simply possible so that a predetermined printing gap 25 is always adjusted in terms of its height. The height of the printing gap 25 is preferably between 0.8 mm and 1.4 mm; very preferably at approximately 1 mm to approximately 1.2 mm. Via a rapid lowering of the web guide elements 23, 24, or the enlargement of the printing gap 25 by the lifting device 37, possible raised locations or adhesive areas on the recording medium 11 may be reacted to very quickly in order to avoid damage to the print heads as a result of contact with the print heads. The upward stroke movements of the cleaning devices 40 and covering caps 27 provide for an exact and rapid positioning of the covering caps 27 for the print bars 14, the wipers 43, and the spraying devices, as well as possible new additional or different cleaning functions. Only a few lines and hoses, for example for the cleaning fluid, are necessary for possible actuators and/or sensors in the web carriage 20 and the maintenance unit 21. Such hoses or lines may be guided by small, light drag chains.

The print bars 14 do not need to be actively driven up or down. A merely passive movement is possible that emerges due to the stroke movement of the cleaning device 40 or the covering cap 27, and thereby forcibly carries along the print bars 14 if the covering cap 27 is placed on the print bars 14. The stroke travel 16 is only very short and corresponds to approximately the height of the covering caps 27. Parked print bars 14, together with the placed covering caps 27, are thereby so far above that they neither hinder the cleaning of other print bars 14 nor interfere with the transport of the recording medium 11. Since the stroke movement is passive and only short, a great deal of space/room is saved in the region of the printing unit 12, relative to conventional ink printers 10 (with parking flaps).

A movement may be performed by an electromechanical or hydraulic lifting device 37, or the drive for the linear movement. The lifting device 37 may respectively be arranged in the maintenance unit 21, in the web carriage 20, in the printing unit 12, or outside of these elements. Since the web carriage 20 and the maintenance unit 21 move only axially in a horizontal direction, a common lifting device 37 for both the web carriage 20 and the maintenance unit 21 may be arranged below this movement region.

The lifting device 37 may thus be designed to be approximately in a u-shape with the stroke guide rods 38. Given a stroke movement, the stroke guide rods 38 are thus moved outside of the recording medium 11 in order to be able to move the web guide element 23, 24 jointly with or separate from the web guide carrier 23, as well as the cleaning device 40 jointly with or separate from the covering cap 27, vertically in an upward thrust or downward stroke.

The stroke movement only occurs as soon as the respective unit (web carriage 20 and maintenance unit 21) is arranged in the printing position 30 or maintenance position 33. The respective web guide elements 23, 24 or cleaning device 40/covering cap 27 may then be driven up and down via stroke guide rods 38. The stroke movement may take place separately for each unit (web guide element 23, 24, cleaning device 40, and covering cap 27). The cleaning device 40 and the covering caps 27 may also be moved jointly in a vertical direction by means of a drive. For placement of the covering caps 27, these need to be raised together with the print bars 14 and the cleaning devices 40. Due to the not necessarily small weight, the drives should not be dimensioned too small, since then a stronger step-down ratio would be necessary that possibly slows the raising process.

The lifting device 37 may also be arranged laterally next to the print bars 14 in the printing unit 12 so that the covering caps 27 or the cleaning devices 40 may be moved up and down without the horizontal, linear movement of web carriage 20 and maintenance unit 21 being interfered with. The lifting devices 37 may also be arranged before and after the print bars 14 in the printing unit 12, outside of the width of the recording medium 11, in order to move covering caps 27 or cleaning device 40.

Both the web carriage 20 and the maintenance unit 21 may respectively have their own internal lifting device 37. However, both units become more complex in terms of their design, whereby the linear movement would be more costly. The lifting device 37 is therefore preferably arranged outside of non-moving parts.

The elements designated for the stroke movement may also be moved by a common lifting device 37, for example as it is depicted in FIGS. 1-8. This reduces the necessity of a plurality of individual lifting mechanisms and position sensors in the web carriage 20 as well as in the maintenance unit 21. The wiring cost and the necessity of flexible lines may thereby also be reduced to a minimum.

The lifting device 37 may be effected by electric motors with gears, drive screws, caps, cables, or via hydraulic/pneumatic cylinders with corresponding guides (rods, rails, racks, wedges etc.). A lifting device 37 that moves vertically by means of a mechanical curved path is likewise possible, but somewhat limits the flexibility and the functionality.

The web carriage 20 and the maintenance unit 21 are moved on a straight line (translation movement, linear movement) by a linear guide (guide rail 22). Both units may be moved together via such a translation guide or linear guide as a mechanical guide element. However, a flexible, variable coupling (not shown in Figures) may be arranged between web carriage 20 and maintenance unit 21, whereby both units may be moved separately from one another or jointly in a horizontal direction. Given coupling of the two units, a single drive may thus move both units, as only one of the two units may ever be arranged under the print bars 14 in the operation of the ink printer 10.

In this specific instance, no second drive is required. However, it is also desirable that the region under the print bars 14 may also be cleared, for example in order to optically inspect the print heads, and therewith none of the two units is arranged below the print bars (as is depicted by way of example in FIG. 3). The two units (web carriage 20 and maintenance unit 21) then must also be moveable separately from one another.

For the translation movement, a guide system may be used in which one or more guide carriages run on one or more stationary, long, mostly straight bodies (the guide rails 22). For the sake of simplicity, the guide rails 22 are normally arranged next to one another in pairs and below the units to be moved horizontally, wherein guide rails 22 and units are most often arranged so as to be displaceable one atop the other (as an upper part and lower part).

Any suitable elements with which a translational stroke movement may be performed, such as a spindle, rack, cable etc., in which a rotation movement is translated into a straight-line movement may be used as a stroke guide rod 38.

A length compensation device is not explicitly depicted in Figures. However, such a length compensation device may be part of the transport device for the recording medium 11. The transport must be very precisely controlled in any event so that the print image is also printed at the correct position. Every movement (forwards movement and also a possible retraction movement) of the web is thereby continuously measured with high precision, for example via suitable incremental sensors in the transport rollers. The drives to be controlled are also designed to be highly precise in any event, in order to measure movements in the μm range and control the desired transport drive accordingly. In addition to this, the dimensions in the ink printer 10 are very precisely known, so that the length compensation device may well resort to the device controller for the transport.

REFERENCE LIST

10 ink printer
11 recording medium
12 printing unit
14 print bar
15 transport direction of the recording medium
16 stroke path
20 web carriage (web guide unit)
21 maintenance unit
22 guide rail (guide element for linear movement)
23, 24 web guide element
23 web guide carriage
24 web guide roller
25 printing gap
27 covering cap (covering device)
30 printing position
31 parked position of the web carriage
32 parked position of the maintenance unit
33 maintenance position
35 transport or deflection rollers
37 lifting device
38 stroke guide rod
39 parked position of the print bars
40 cleaning device
42 linear movement path
43 wiper
44 wiper blade

45 wiper carrier

47 auxiliary device

The invention claimed is:

1. An ink printer for printing to a recording medium in the form of a web, the ink printer comprising:

a printing unit with at least one print bar having one or more print heads for printing an ink color, wherein the printing unit is arranged stationary in the ink printer, a web guide unit movable on an axis to guide the recording medium, the web guide unit being arranged so as to be linearly movable along a guide element below the printing unit, and a maintenance unit movable on an axis to service the printing unit, the maintenance unit being arranged so as to be linearly movable along the guide element below the printing unit, wherein, in a printing state, the web guide unit is positioned in a region of the print bars below the printing unit and, in a maintenance state, the maintenance unit is positioned in the region of the print bars, wherein the web guide unit and the maintenance unit are mechanically coupled with one another so as to be releasable, and are configured to be moved linearly, independently of one another or jointly, on the guide element in a horizontal direction, wherein the web guide unit comprises one or more web guide elements that, in the printing state, are coupled with a lifting device in order to move the recording medium in a stroke movement in a direction of the printing unit to perform a printing operation, wherein the maintenance unit comprises at least one cleaning device and at least one covering device, wherein, in the maintenance state, the cleaning device and the covering device are coupled with the lifting device in order to move the cleaning device and/or the covering device jointly or separately in the direction of the printing unit for maintenance, and wherein the lifting device is arranged below the web guide unit and the maintenance unit, the lifting device comprising stroke elements that are moved vertically, to a side of and next to the recording medium, in order to perform the respective stroke movement for the web guide elements, the cleaning device, and/or the covering device.

2. The ink printer according to claim 1, wherein the cleaning device comprises a wiping device and a spraying device in order to clean the one or more print heads.

3. The ink printer according to claim 1, wherein the covering device is connected with the cleaning device so as to be releasable, wherein the covering device, in a parked state, covers the one or more print heads to protect the nozzles from drying out.

4. The ink printer according to claim 3, wherein the covering device, in the parked state, is mechanically locked in the printing unit in order to hold its positioned independently without an influence of force by the lifting device.

5. The ink printer according to claim 1, wherein the at least one print bar is designed so as to be passively movable in a vertical direction, and are forcibly moved as well in the vertical direction via stroke movement of the covering device and/or of the cleaning device.

6. The ink printer according to claim 1, wherein the web guide unit has a length compensation device that, given a linear movement of the web guide unit, is controlled so that a desired starting position on the recording medium for restarting the printer and a desired tensile stress in the recording medium are maintained.

* * * * *